United States Patent [19]

Kammermaier et al.

[11] Patent Number: 5,035,917

[45] Date of Patent: Jul. 30, 1991

[54] METHOD OF PREPARING LAYERS OF VINYLIDENE FLUORIDE POLYMERS AND VINYLIDENE FLUORIDE/TRIFLUOROETHYLENE COPOLYMERS ON A SUBSTRATE

[75] Inventors: Johann Kammermaier, Unterhaching; Gerhard Rittmayer, Erlangen, both of Fed. Rep. of Germany

[73] Assignee: Siemens Aktiengesellschaft, Berlin & Munich, Fed. Rep. of Germany

[21] Appl. No.: 529,246

[22] Filed: May 25, 1990

[30] Foreign Application Priority Data

Jun. 22, 1989 [DE] Fed. Rep. of Germany ....... 3920535

[51] Int. Cl.$^5$ .............................................. B05D 3/06
[52] U.S. Cl. ..................................... 427/41; 427/45.1
[58] Field of Search ................................ 427/41, 45.1

[56] References Cited

U.S. PATENT DOCUMENTS 4,382,985 5/1983 Hattori et al. ...................... 427/41
4,729,906 3/1988 Kleeberg et al. .................... 427/41

OTHER PUBLICATIONS

Okada, Y., "Glow-Discharge-Polymerized Difluoroethylene Film", 74 Thin Solid Films, pp. 69-76 (1980).

*Primary Examiner*—Bernard Pianalto
*Attorney, Agent, or Firm*—Kenyon & Kenyon

[57] ABSTRACT

Layers consisting of vinylidene fluoride polymers or vinylidene fluoride/trifluoroethylene copolymers can be prepared with a thickness of <10 μm, whereby the dielectric constant or the ferroelectric properties simultaneously correspond to those of known materials. Vinylidene fluoride or a mixture of vinylidene fluoride and trifluoroethylene in a concentration of $\leq 5 \times 10^{-9}$ mol/cm$^3$ is subjected to a low pressure plasma polymerization which is excited by microwaves, and the polymer or copolymer is deposited onto a substrate at an electric field strength of <850 V/cm.

19 Claims, No Drawings

METHOD OF PREPARING LAYERS OF VINYLIDENE FLUORIDE POLYMERS AND VINYLIDENE FLUORIDE/TRIFLUOROETHYLENE COPOLYMERS ON A SUBSTRATE

BACKGROUND OF THE INVENTION

1. Field of the Invention

The invention relates to a method of preparing layers of vinylidene fluoride polymers and vinylidene fluoride/trifluoroethylene copolymers.

2. Description of Related Art

For applications in microelectronic engineering, for example as integratable single layer capacitors (with a capacitance density $>10$ nF/cm$^2$) for storage modules, or as thin layer piezo- or pyroelectric elements, polymers are required on a plastic base with ferroelectric properties or at least with a dielectric constant $>5$ in an unpolarized state. The only known representatives of ferroelectric plastics are polymers consisting of vinylidene fluoride, i.e. polyvinylidene fluoride (PVDF), and copolymers consisting of vinylidene fluoride and trifluoroethylene (c.f. e.g.: "Appl. Phys. Lett.", Vol. 36 (1980), pp 286 to 288).

Heretofore, the synthesis of pqlyvinylidene fluoride, i.e. poly(1,1-difluoroethylene), and vinylidene fluoride/trifluoroethylene copolymers has taken place exclusively in a conventional chemical manner; that is, by means of polymerization of the corresponding monomers with the aid of catalyzers, e.g. through peroxide catalyzed emulsion- or suspension (bead) polymerization of vinylidene fluoride at an elevated temperature and an elevated pressure. The polymers or copolymers are then processed into cast films, e.g. from solutions in methyl-ethyl-ketone. Next, the cast films are stretched at temperatures above 100° C. to four times the original length to attain ferroelectric properties, and in this state they are frozen by means of rapid cooling and/or are polarized by means of electric fields up to 100 U/μm.

Presently, the known ferroelectric plastics are only available as foils with a minimum thickness of approximately 10 μm. For applications in microelectronic engineering, however, these materials would have to have a much smaller thickness, indeed down to the sub-μm-range.

It is an object of the present invention to specify a method which permits the preparation of layers consisting of vinylidene fluoride polymers and vinylidene fluoride/trifluoroethylene copolymers having a thickness of $>10$ μm, where the dielectric constant or the ferroelectric properties of the layers correspond to those of the presently known materials.

SUMMARY OF THE INVENTION

According to the invention, a monomer in the form of vinylidene fluoride or a mixture of vinylidene fluoride and trifluoroethylene in a concentration $\leq 5 \times 10^{-9}$ mol/cm$^3$ is subjected to a low pressure plasma polymerization which is excited by microwaves. The polymer or copolymer is deposited onto a substrate at an electric field strength of $<850$ V/cm. "Electric field strength" is understood as the amplitude $E_o$ of the active field strength in the region of the substrate.

DETAILED DESCRIPTION OF THE INVENTION

Plasma polymerization basically offers the possibility of preparing polymers in the form of thin layers. Moreover, it is known from EP-PS 0 132 684 how to implement the glow discharge in the microwave range between 0.5 and 1000 GHz during the generation of so-called glow polymerisate layers on a substrate - from monomeric hydrocarbons and/or fluorocarbons by means of a high frequency low pressure glow discharge—whereby the amplitude of the active field strength in the region of the substrate is $\leq 850$ V/cm during the microwave discharge. The microwave discharge is thereby carried out at a pressure of 0.1 to 1 mbar, preferably at a pressure of approximately 0.5 mbar.

For example, ethylene, propene, butene, butadiene and cyclohexene can be used as hydrocarbon monomers in this method. Perfluorinated compounds are used as fluorocarbons, whereby octafluorocyclobutane is given preference. Further usable perfluorinated compounds are tetrafluoroethylene, perfluoropropene, perfluorobutene and perfluorocyclohexane.

Plasma polymerisates consisting of vinylidene fluoride or vinylidene fluoride and trifluoroethylene with properties which correspond to conventionally prepared polymerisates have not been known prior to the present invention. The reason for the fact that the former method of plasma polymerization does not lead to success in the case of these compounds may lie in that under the usual conditions in low pressure plasmas, fluorine and hydrogen atoms are separated from the molecules of the monomers and are carried away with the gas stream so that they are removed from the layer formation process. Thus, the plasma polymerisates have a different elemental composition than the monomers: the plasma polymerisates are greatly cross-linked and are not able to be ferroelectrically polarized.

During the plasma polymerization of fluorocarbons such as octafluorocyclobutane, i.e. perfluorinated hydrocarbons, a structurally damaging splitting off of fluorine from the monomer cannot be suppressed in the most typical radio-frequency-excited plasmas. However, such a splitting can be suppressed in microwave-excited plasmas during the deposition process in the region of low electric field strengths according to the method known from the teachings of EP-PS 0 132 684. However, this method is also not suitable for the plasma polymerization of compounds such as vinylidene fluoride and trifluoroethylene, which, in contrast to perfluorinated hydrocarbons, merely represent partially fluorinated hydrocarbons. Evidently, due to the comparatively high depositing rates on the reactor wall, in particular in the region of the microwave entryway, the unavoidable splitting off of fluorine and hydrogen from the monomers in the regions of the plasma with a greater power density namely results, in this case, in conductive carbonaceous layers which very quickly cause the discharge to extinguish.

Therefore, it could not have been anticipated and it was very surprising that when a comparatively low concentration of the monomer is set in the plasma, as is the case in the method according to the invention, even vinylidene fluoride and trifluoroethylene are accessible to plasma polymerization. The low concentration of the monomer is thereby advantageously set in a manner such that either the partial pressure of the monomer amounts to $<100$ μbar or the monomer is set in a mixture with an inert gas at a total pressure of >100µbar, whereby the monomer concentration preferably amounts to <10 Vol.-%. Preferably nitrogen or a rare gas is thereby used as an inert gas. Within the scope of the present patent application, the gaseous elements helium, neon, argon, krypton and xenon are designated as "rare gas". These materials can be used alone or are mixed together, even in a mixture with nitrogen. Preferably, argon is used.

In the method according to the invention, the monomer thus is introduced into a low pressure plasma, which is excited by microwaves, greatly diluted, i.e., mixed with an inert gas, or, with a very low density, i.e. at low pressure. The deposition then takes place at electric field strengths of <850 V/cm, i.e., directly at the border of the visible plasma or just outside this border. The inert gas can be supplied to the plasma polymerization reactor together with the monomer if an inert gas is being used. However, the inert gas is advantageously introduced separately from the monomer into the reactor directly within the region of the plasma.

In the method according the invention, the monomers which can be used are vinylidene fluoride ($CH_2=CF_2$), i.e. 1,1- difluoroethylene, or a mixture of vinylidene fluoride and trifluoroethylene ($CHF=CF_2$). The mixture of vinylidene fluoride and trifluoroethylene thereby preferably contains between 20 and 50 Mol-% of trifluoroethylene. These types of mixtures contain vinylidene fluoride and trifluoroethylene in the following ratio, e.g. (in Mol-%): 78:22, 73:27, 65:35 and 52:48.

The invention shall be more closely explained in light of the following exemplified embodiments.

A so-called plasma polymerization reactor, in which one or several substrates consisting e.g. of glass or metal or in the form of silicone wafers are mounted, is used to implement the method according to the invention. The cylindrical reactor is surrounded in its center by a resonator cavity which is connected to a microwave generator (frequency: e.g. 2.45 GHz). The deposition of the layer takes place respectively at the border or directly next to the outside of the visible plasma which primarily forms in the region of the resonator cavity. In this manner, the layer deposition generally takes place upstream with reference to the monomer gas.

The gaseous monomer or monomer mixture is always supplied to the reactor outside the visible plasma region, generally at one of the two reactor ends. For this purpose, the reactor is connected to a storage tank for the monomer by way of a gas line. In the case of the use of an inert gas such as argon, a second line, to which a storage tank for the inert gas is connected, can open into this gas line. A needle valve, a pressure gauge and a flow meter are mounted in both gas lines, respectively. The second end of the reactor is connected to a vacuum pump by a gas line in which a choker valve and, if applicable, a cold trap are mounted.

If the inert gas is introduced into the reactor separately from the monomer, which preferably takes place in the region of the resonator cavity mounted in the middle, then it is advantageous to supply the monomer to both reactor ends in order to attain symmetrical flow conditions. The removal of the mixture consisting of the unused monomer and inert gas takes place in this case in the middle of the reactor in the region of the visible plasma. In the case of the centrical supplying of the inert gas, the visible plasma is largely carried by species of the inert gas and accordingly, the monomer is largely kept away from the plasma. Since, in this manner, a far lower proportion of monomer molecules is excited by the plasma in a structurally damaging way than is the case in the absence of inert gas, a greater monomer gas intake can take place in the case of this method variation than is otherwise the case, in order to increase the deposition rate.

The preparation of polyvinylidene fluoride takes place e.g. from pure, i.e. undiluted, vinylidene fluoride or from a mixture of vinylidene fluoride and argon with a proportion of the monomer of 1 Vol.-%. In the first case, a pressure of <70 µbar is set which corresponds to a monomer concentration of approximately $3 \times 10^{-9}$ mol/cm$^3$. In the second case, the pressure amounts to approximately 250 µbar and the monomer concentration is approximately $1 \times 10^{-10}$ mol/cm$^3$. The power supplied to the reactor amounts to 27 W in the first case and to 40 W in the second case, corresponding to 14 or 20% of the power of the microwave generator.

In both cases, the deposition of the polymer takes place upstream directly outside of the visible plasma at field strengths of <850 V/cm, whereby 0.3 µm thick layers are produced, respectively. The dielectric constant of the polymer layers lies above 6 in both cases; the dielectric loss factor at 1 KHz equals $5 \times 10^{-2}$.

What is claimed is:

1. A method of preparing layers of vinylidene fluoride polymers and vinylidene fluoride/trifluoroethylene copolymers comprising the steps of subjecting a monomer in the form of vinylidene fluoride or a mixture of vinylidene fluoride and trifluoroethylene in a concentration of $<5 \times 10^{-9}$ mol/cm$^3$ to a low pressure plasma polymerization which is excited by microwaves, and depositing the polymer or copolymer onto a substrate at an electric field strength of <850 V/cm.

2. The method according to claim 1, wherein the mixture of vinylidene fluoride and trifluoroethylene contains between 20 and 50 Mol-% trifluoroethylene.

3. The method according to claim 1, wherein the partial pressure of the monomer amounts to <100 µbar.

4. The method according to claim 2, wherein the partial pressure of the monomer amounts to <100 µbar.

5. The method according to claim 1, wherein the monomer is used in a mixture with an inert gas at a total pressure of >100 µbar.

6. The method according to claim 2, wherein the monomer is used in a mixture with an inert gas at a total pressure of >100 µbar.

7. The method according to claim 5, wherein the monomer concentration in the mixture amounts to <10 Vol.-%.

8. The method according to claim 6, wherein the monomer concentration in the mixture amounts to <10 Vol.-%.

9. The method according to claim 5, wherein nitrogen or a rare gas is used as inert gas.

10. The method according to claim 9, wherein argon is used as inert gas.

11. The method according to claim 6, wherein nitrogen or a rare gas is used as inert gas.

12. The method according to claim 7 wherein nitrogen or a rare gas is used as inert gas.

13. The method according to claim 8 wherein nitrogen or a rare gas is used as inert gas.

14. The method according to claim 5, wherein the inert gas is introduced separately from the monomer into a plasma polymerization reactor directly within the region of the plasma.

15. The method according to claim 6, wherein the inert gas is introduced separately from the monomer into a plasma polymerization reactor directly within the region of the plasma.

16. The method according to claim 7, wherein the inert gas is introduced separately from the monomer into a plasma polymerization reactor directly within the region of the plasma.

17. The method according to claim 8, wherein the inert gas is introduced separately from the monomer into a plasma polymerization reactor directly within the region of the plasma.

18. The method according to claim 9, wherein the inert gas is introduced separately from the monomer into a plasma polymerization reactor directly within the region of the plasma.

19. The method according to claim 10, wherein the inert gas is introduced separately from the monomer into a plasma polymerization reactor directly within the region of the plasma.

* * * * *